US006783682B1

(12) United States Patent
Awerbuch

(10) Patent No.: US 6,783,682 B1
(45) Date of Patent: Aug. 31, 2004

(54) SALT WATER DESALINATION PROCESS USING ION SELECTIVE MEMBRANES

(75) Inventor: Leon Awerbuch, Cairo (EG)

(73) Assignee: L.E.T., Leading Edge Technologies Limited, Douglas (GB)

( * ) Notice: Subject to any disclaimer, the term of this patent is extended or adjusted under 35 U.S.C. 154(b) by 0 days.

(21) Appl. No.: 09/641,123

(22) Filed: Aug. 16, 2000

Related U.S. Application Data

(60) Provisional application No. 60/150,159, filed on Aug. 20, 1999.

(51) Int. Cl.[7] .............................................. B01D 61/00
(52) U.S. Cl. ........................ 210/652; 210/653; 210/651; 210/175; 210/767
(58) Field of Search ................................ 210/180, 652, 210/651, 653, 175, 767

(56) References Cited

U.S. PATENT DOCUMENTS

| 3,725,267 | A | * | 4/1973 | Gelblum |
| 3,923,607 | A | * | 12/1975 | Tabata et al. |
| 4,036,749 | A | * | 7/1977 | Anderson |
| 4,083,781 | A | * | 4/1978 | Conger |
| 4,341,629 | A | * | 7/1982 | Uhlinger ..................... 210/128 |
| 4,723,603 | A |   | 2/1988 | Plummer ..................... 166/275 |
| 5,238,574 | A | * | 8/1993 | Kwashima et al. |
| 6,113,797 | A | * | 9/2000 | Al-Samadi |
| 6,190,556 | B1 |  | 2/2001 | Uhlinger ..................... 210/636 |
| 6,508,936 | B1 | * | 1/2003 | Hassan ....................... 210/652 |

FOREIGN PATENT DOCUMENTS

| JP | 5738982 | * | 3/1982 |
| JP | 59102492 | * | 6/1984 |
| JP | 9141260 | * | 11/1995 |
| JP | 9141260 | * | 6/1997 |
| WO | 9916714 |   | 4/1999 |

OTHER PUBLICATIONS

Glen G. Wensley et al, Ion Selective Membranes A Presoftenig Process Fro Seawater Distillation, 7th International Symposium on Fresh Water from the sea, vol. 1, 417–426, 1980.*

* cited by examiner

Primary Examiner—Ana Fortuna
(74) Attorney, Agent, or Firm—White & Case LLP

(57) ABSTRACT

The invention is directed to an improved desalination process to produce potable water. The process represents an improvement of hybrid of membrane and desalination technologies. The improvement of the invention comprises the operation of an ion selective membrane at a variable pressure as a function of the cost of electricity to form a softened salt water that is blended in variable proportions, to increase the top operating temperature of the desalination system and increase recovery of potable water, with untreated salt water.

19 Claims, 9 Drawing Sheets

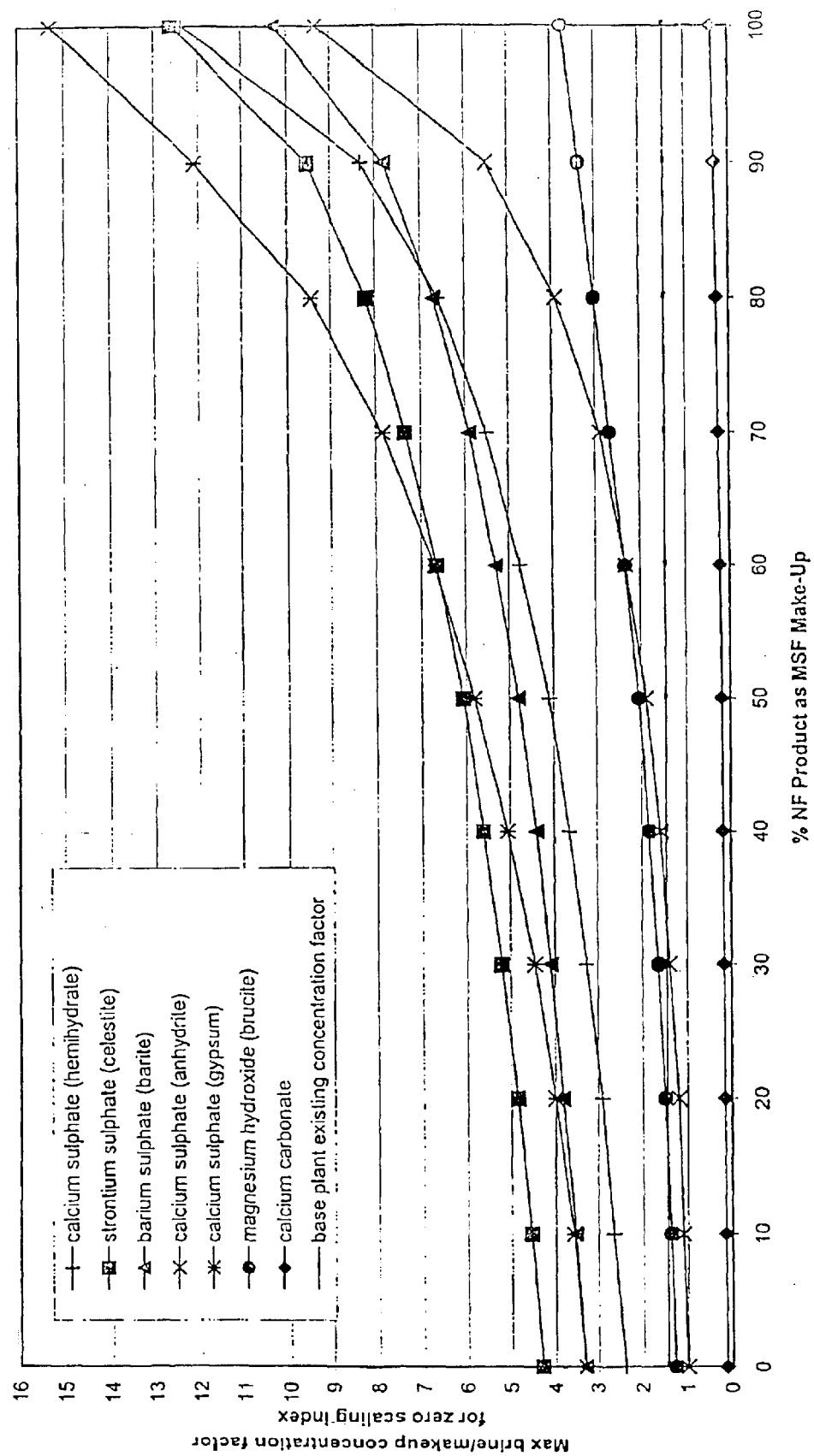
Figure 6  Brine Temperature 115°C

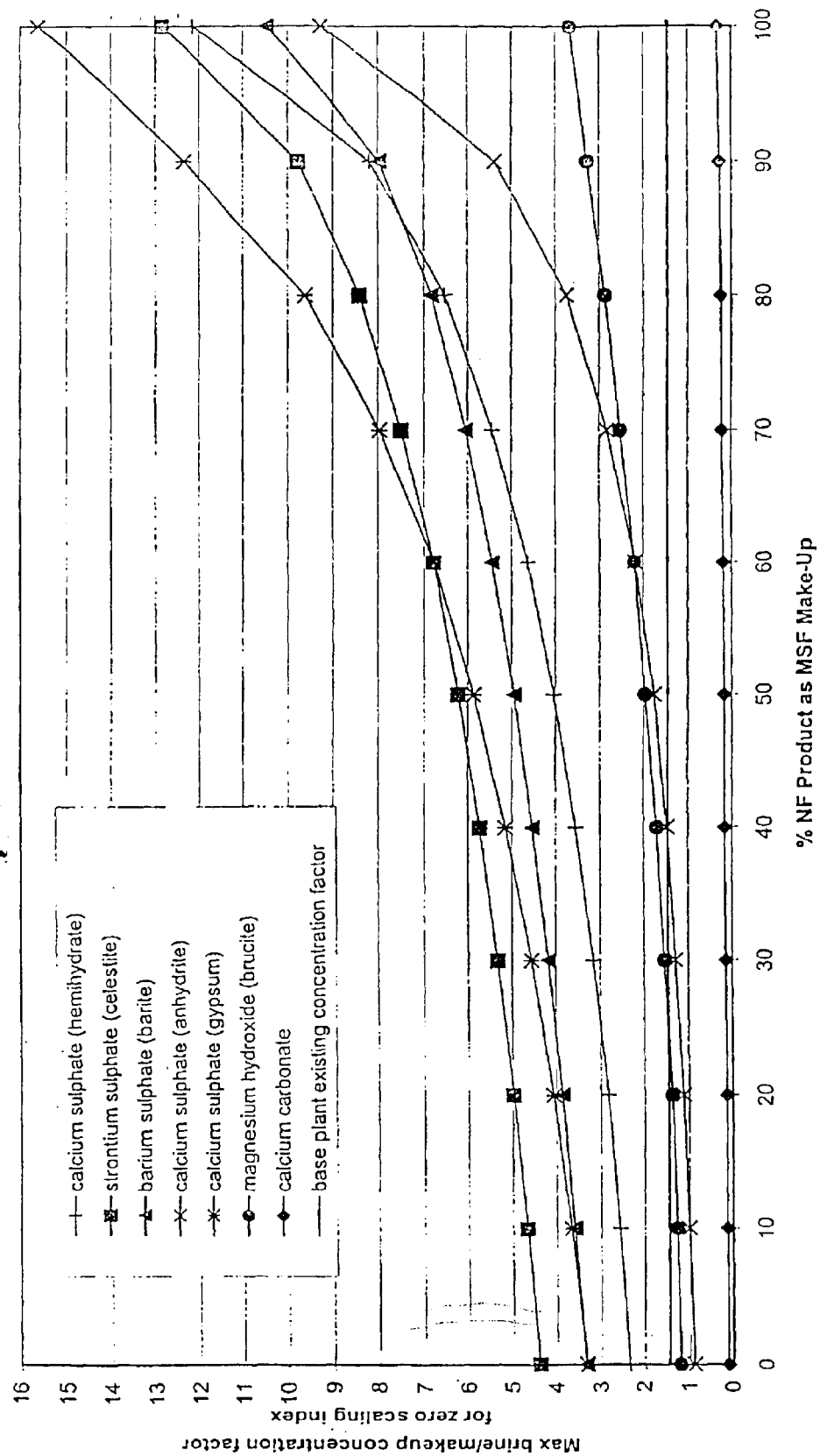
Figure 7 - Brine Temperature 120°C

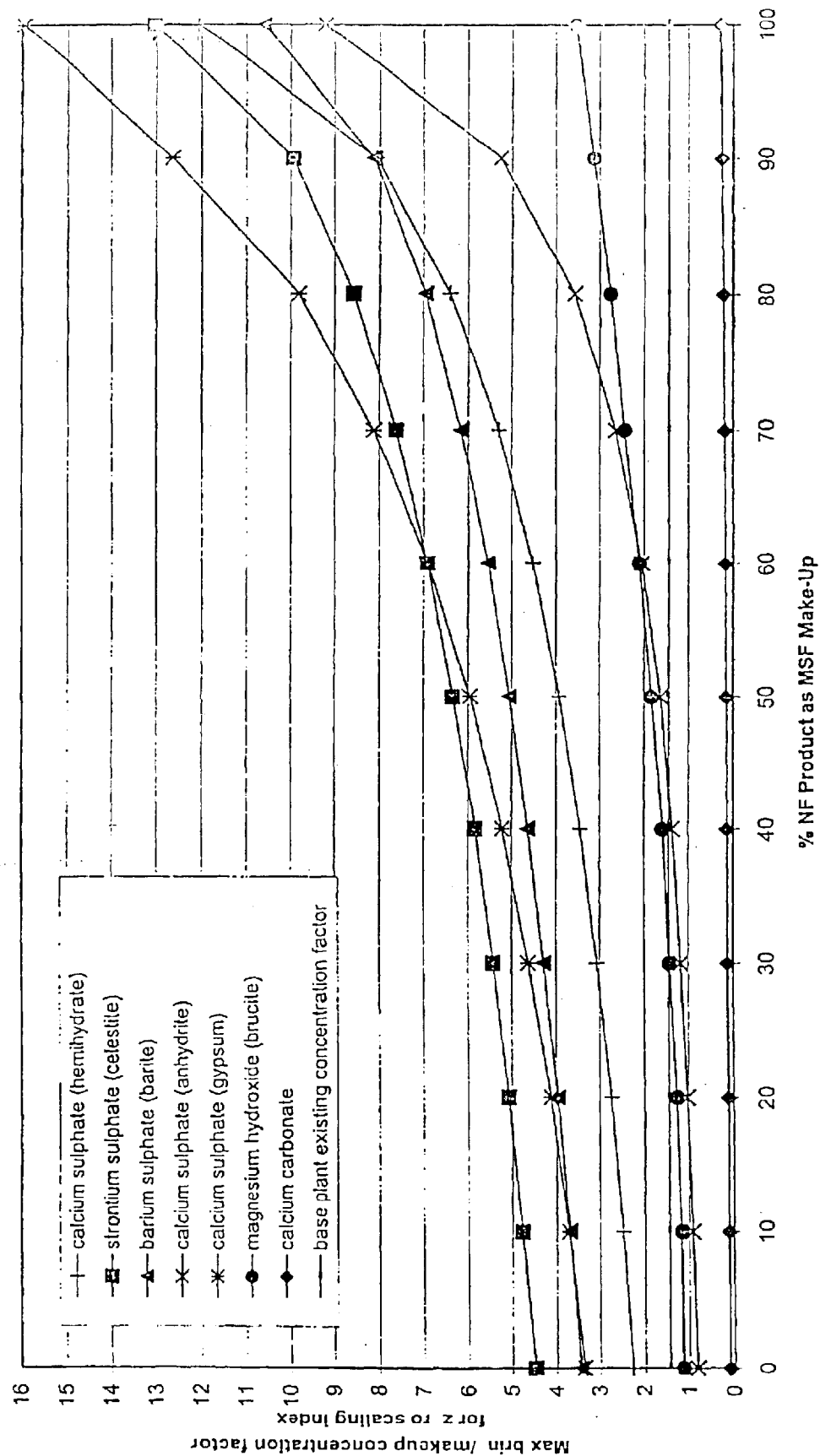
Figure 8 - Brine Temperature 125 °C

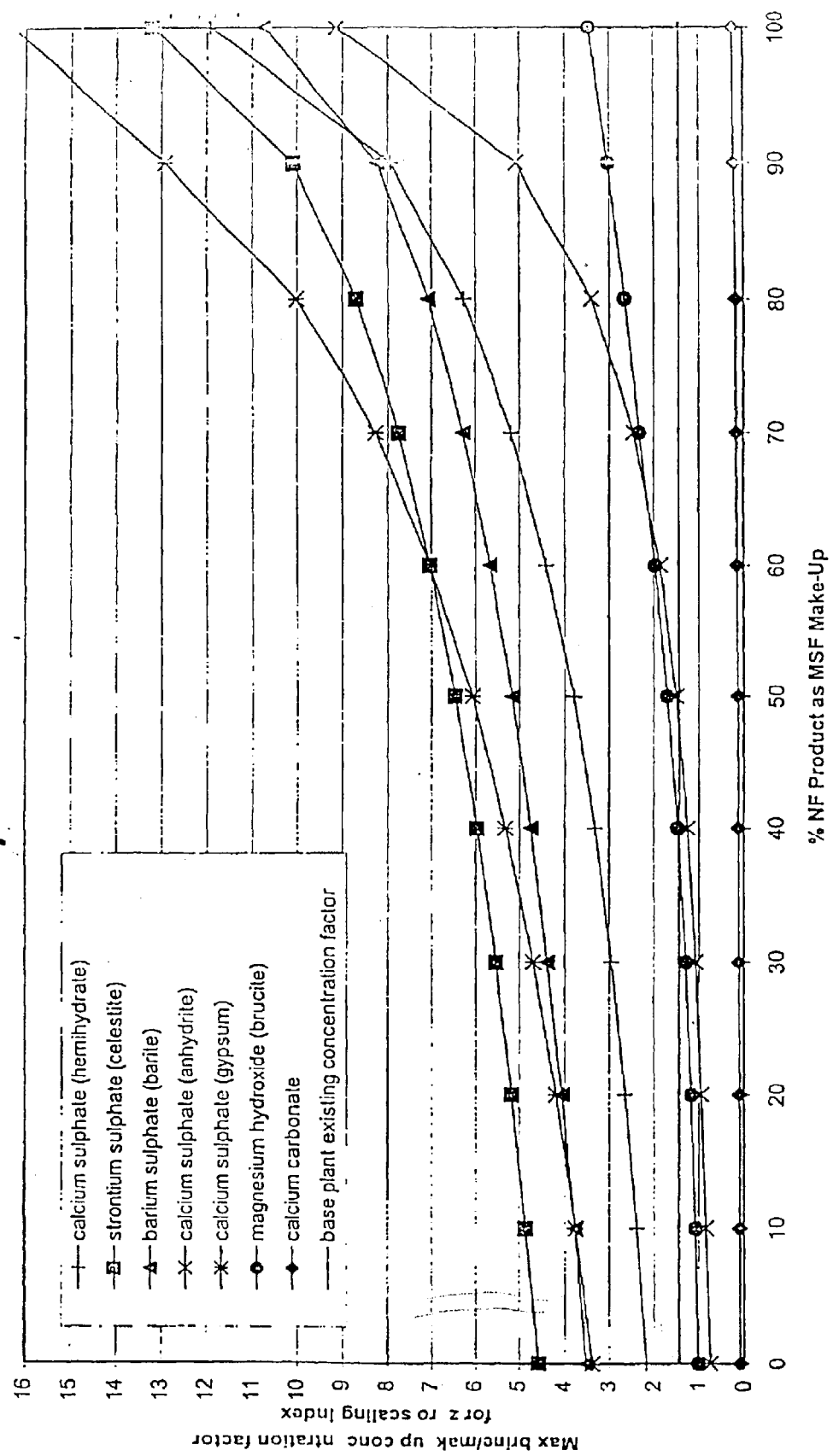
Figure 9 - Brine Temperature 130 °C

SALT WATER DESALINATION PROCESS USING ION SELECTIVE MEMBRANES

This application claims priority to U.S. provisional patent application having the application Ser. No. 60/150,159, filed Aug. 20, 1999.

BACKGROUND OF INVENTION

1. Technical Field

The present invention relates to a water purification process and more particularly, it relates to an improved process for the desalination of salt water by the strategic use of ion selective membranes to form a variable make-up that is fed to a desalination unit to produce a water product of potable quality.

2. Description of Related Art

The basic processes for the desalination of salt water to produce a water product of potable quality include, for example, multistage flash distillation, multieffect distillation, reverse osmosis and vapor compression distillation. Each of these processes are well established technologies having their own unique characteristics and limitations. The high content of scale forming ions, saline and other impurities found in untreated salt water has a negative impact on the efficiency, energy consumption and maintenance of large scale plants which employ any of these conventional desalination processes. Due to such high concentrations of impurities, it is commonly known to add antiscalling chemicals to the feed or equipment to minimize the adverse consequences of scale forming ions.

Multistage flash distillers which are in common use worldwide for large scale desalination projects are limited in their performance by the maximum brine temperature (top brine temperature or TBT) that can be used in the process. At temperatures higher than the maximum, scale inhibitors are ineffective and significant fouling of the internal surfaces will rapidly occur. This can be expensive and time consuming to remove.

Membrane technology has been used in the pre-treatment of salt water to reduce the high ionic content of salt water relative to fresh water. For example, U.S. Pat. No. 4,723,603 discloses a process for removing precursor ions from an injection water which formed insoluble salt precipitates in situ when they contacted resident ions already present in a subterranean hydrocarbon-bearing formation. The precursor ions of the insoluble salt precipitates are removed by means of a RO membrane.

More importantly for desalination, WO 99/16714 discloses the combination of membrane technology with the basic desalination processes to from a drinkable water product. According to this document, saline water containing a high content of hardness scaling ions is passed through a nanofiltration membrane to form make-up to a desalination system. Nanofiltration softening membranes are used for the selective removal of hardness scale forming ions and other impurities to soften seawater. Due to nanofiltration treatment, the make-up has a reduced ionic content when it passes through the desalination system. It is reported that there is a reduction of scaling and fouling tendency when this combination of nanofiltration and desalination systems is employed. However, the document does not suggest any means of taking advantage of the inter-relationship among certain conditions, e.g., pressure, temperature and make-up, to achieve an optimal system and recovery.

It will be seen that in spite of these disclosures, there is still a great need for a process that optimizes the combination of these two technologies to improves the operating conditions, efficiency and yield of this type of hybrid desalination systems.

SUMMARY OF THE INVENTION

Accordingly, the present invention is directed to an improved process for desalinating salt water at optimal operating conditions. In accordance with the invention, the content of hardness ions is sufficiently reduced from the make-up to a desalination system such that the desired top operating temperature, or desired recovery of potable water product, of any desalination system can be achieved. As a direct result, a number of advantages are realized which include a more cost-efficient operation of desalination plants, a reduction in the energy consumption of such plants and an increased yield of potable water. In addition, the use of chemical anti-scaling agents is advantageously minimized or completely eliminated. These and other advantages are achieved by specific improvements of hybrid desalination systems based on combined membrane and conventional desalination technologies.

As used throughout the following discussion, the term "salt water" shall mean to include water having a significant concentration of hardness or scale forming ions, e.g., sulfate, calcium, magnesium and bicarbonate ions. Sources of salt water which are contemplated by the present invention include, without limitation, ocean water, gulf water, reject, blowdown and recycle brine in solution and impaired water containing soluble salts having an ionic content of hardness ions in excess of 1,500 mg/liter.

In accordance with the present invention, a first stream of salt water containing a high concentration of hardness ions is passed through an ion selective membrane to form a softened salt water product having a reduced content of hardness ions. The softened salt water is blended with a second stream of salt water containing a high concentration of hardness ions to form a feed to a desalination system. The feed is then introduced to the desalination system to form a water product of potable quality. The softened salt water content of the feed is at least 5%. The desalination system may be one or more desalination processes including reverse osmosis, multistage flash distillation, multieffect distillation and vapor compression distillation.

In one embodiment of the invention, a nanofiltration (NF) membrane is employed as the ion selective membrane. A NF membrane softening system comprising one or more of such NF membranes is combined with a multistage flash (MSF) distillation plant. The NF system is introduced after the MSF-dearerator. In one embodiment, untreated saltwater is first subjected to a deaeration pre-treatment step before entering the NF system. Alternatively, a stream of softened sea water exits the NF system and then enters the MSF-dearerator for the removal of non-condensable gases from the softened water. A portion of the stream of untreated salt water is pre-heated by the heat of a reject stream exiting the reject section of the desalination plant before passing through the NF membrane system. The MSF distillation system is operated at a TBT of 95–180° C. The NF membrane system is operated at a variable pressure of 5–60 bar. To be discussed in more detail, the ability to vary the operating pressure of the NF system provides a means of control over the ionic content and quantity of softened salt water.

In another embodiment of the invention, the softened salt water is stored in a buffer system from where it is blended with a stream of untreated salt water to form the feed to the desalination system. Alternatively, the softened salt water that is stored in the buffer system is injected into the desalination system. Additionally, this reserved supply of softened salt water is used to form a cluster feeding system wherein the softened salt water is fed from the buffer system to two or more desalination systems for blending with untreated salt water.

In yet another embodiment, a partial stream of reject brine, blowdown or recycled brine produced during the desalination process is subject to a nanofiltration step and recycled through the desalination system.

BRIEF DESCRIPTION OF THE DRAWINGS

FIGS. 6–9 plot the anhydrite scaling index against NF treated make-up blend ratios and at various concentration factors.

DESCRIPTION OF THE PREFERRED EMBODIMENTS

Figure 1:
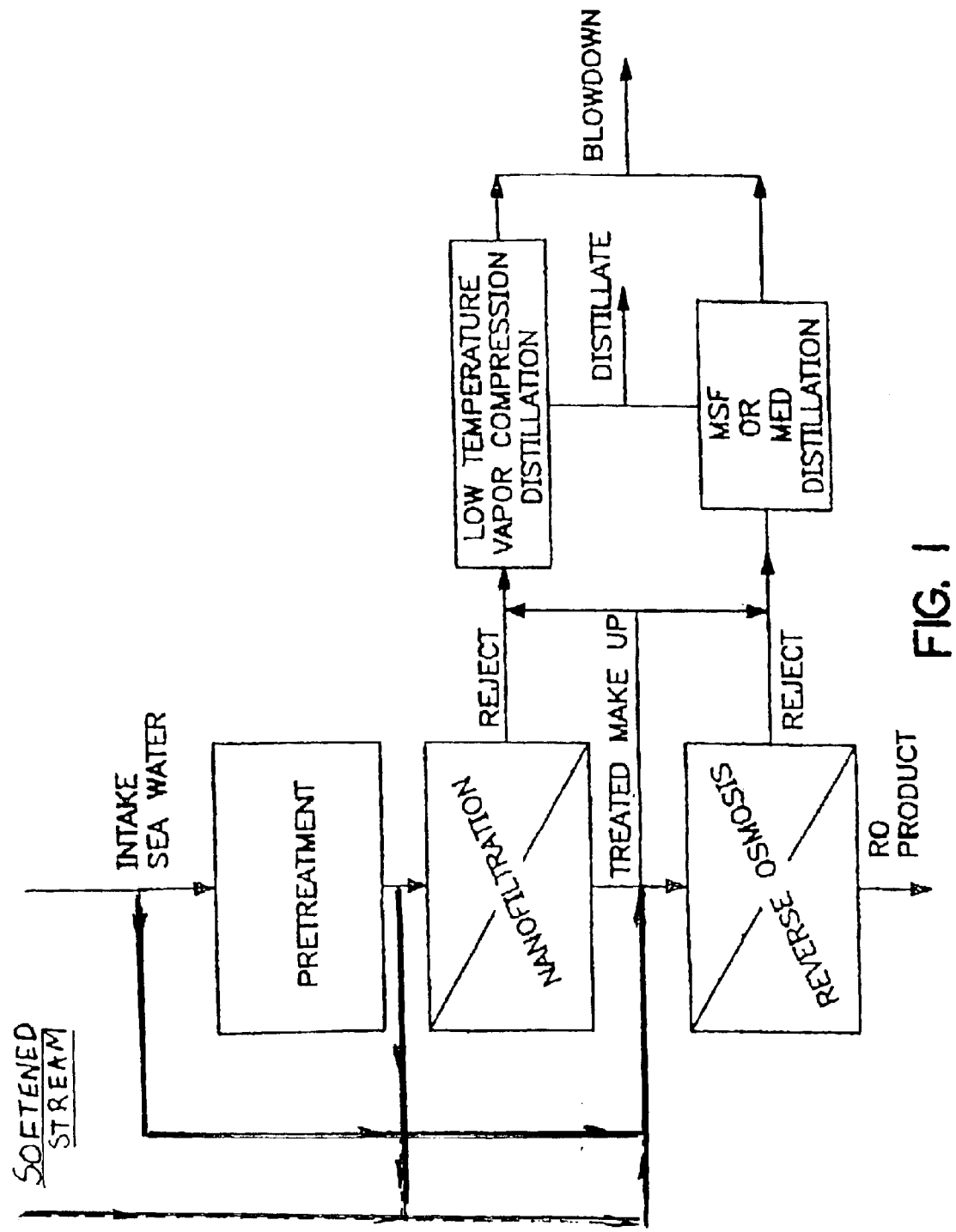
FIG. 1 is a schematic flow diagram of an integrated hybrid desalination process using a hybrid of nanofiltration and desalination systems in accordance with the invention.

The prior art desalination processes which are based on combined ion selective membrane and conventional water desalination systems are significantly improved with the present invention. Having read and understood the features and principles of the invention as presently described and shown in the figures, an experienced engineer in designing, manufacturing and operating water desalination systems of the type contemplated by this invention would be able to practice the invention and realize its benefits.

According to one aspect of the invention, the improvement resides with the discovery that the make-up to the desalination plant can be purposefully configured at any stage of operation to achieve higher top operating temperatures and increased yields of potable water. Surprisingly, it has been discovered that even a partial elimination of calcium and sulfate ions from the feed will advantageously improve the performance of desalination plants. This improvement is not suggested by the prior art. Specifically, by using a feed comprising variable proportions of softened and untreated salt water, the concentration of hardness ions is sufficiently reduced, thereby allowing a beneficial increase in the TBT of the desalination process. Higher operating temperatures provide an increase in productivity, recovery and performance at lower energy and chemical consumption. As a result, the cost of desalinated water production, including operation and maintenance, when compared to the prior art hybrid systems is dramatically reduced.

In accordance with the present invention, one or more ion selective membranes is introduced into a desalination system for the purpose of providing flexibility in managing the ionic content of the make-up to the desalination plant. Any of the known and art-recognized desalination systems can be used in the present invention. Desalination processes such as reverse osmosis, multistage flash distillation, multieffect distillation and vapor compression distillation are known throughout the relevant industry and sufficiently described in the literature. The operation of any of these conventional systems is considered to be well within the purview of the skilled artisan.

Similarly, ion selective membranes are known in the art. As contemplated by the present invention, the membrane is preferably one which selectively prevents the hardening ions from passing across it while at the same time allowing the water and harmless ions to pass across it. For the express purposes of the invention, the membrane is used for the selective removal of hardness ions to soften salt water. The selectivity of a membrane is a function of the particular properties of the membrane, including the pore size or electrical charge of the membrane. Accordingly, any of the known and commercially available ion selective membranes which meet theses criteria can be used with the invention. For example, a polyamide membrane is particularly effective for selectively preventing sulfate, calcium, magnesium and bicarbonate ions from passing across it. A polyamide membrane having the trade name SR90-400 (Film Tec Corporation) or q Hydranautics CTC-1 is preferred. A membrane element comparison of Filmtec SR90 400 and Hydranautics CTC-1 is shown in Table 1:

TABLE 1

MEMBRANE ELEMENTS COMPARISON

| | FILMTEC SR90 400 | HYDRANAUTICS CTC-1 |
|---|---|---|
| Maximum applied pressure | 600 psig (4.16 Mpa) | 600 psig (4.16 Mpa) |
| Maximum operating temp. | 45° C. | 45° C. |
| Maximum flow rate | 72 gpm (16.4 m$^3$/h) | 75 gpm (17 m$^3$/h) |
| Maximum feed SDI | 5 | 5 |
| Membrane area | 3.72 × 10$^5$ cm$^2$ (400 ft$^2$) | 3.72 × 10$^5$ cm$^2$ (400 ft$^2$) |
| Element length/ diameter | 101.6 cm × 20.32 cm (40" × 8") | 101.6 cm × 20.32 cm (40" × 8") |

Figure 5:
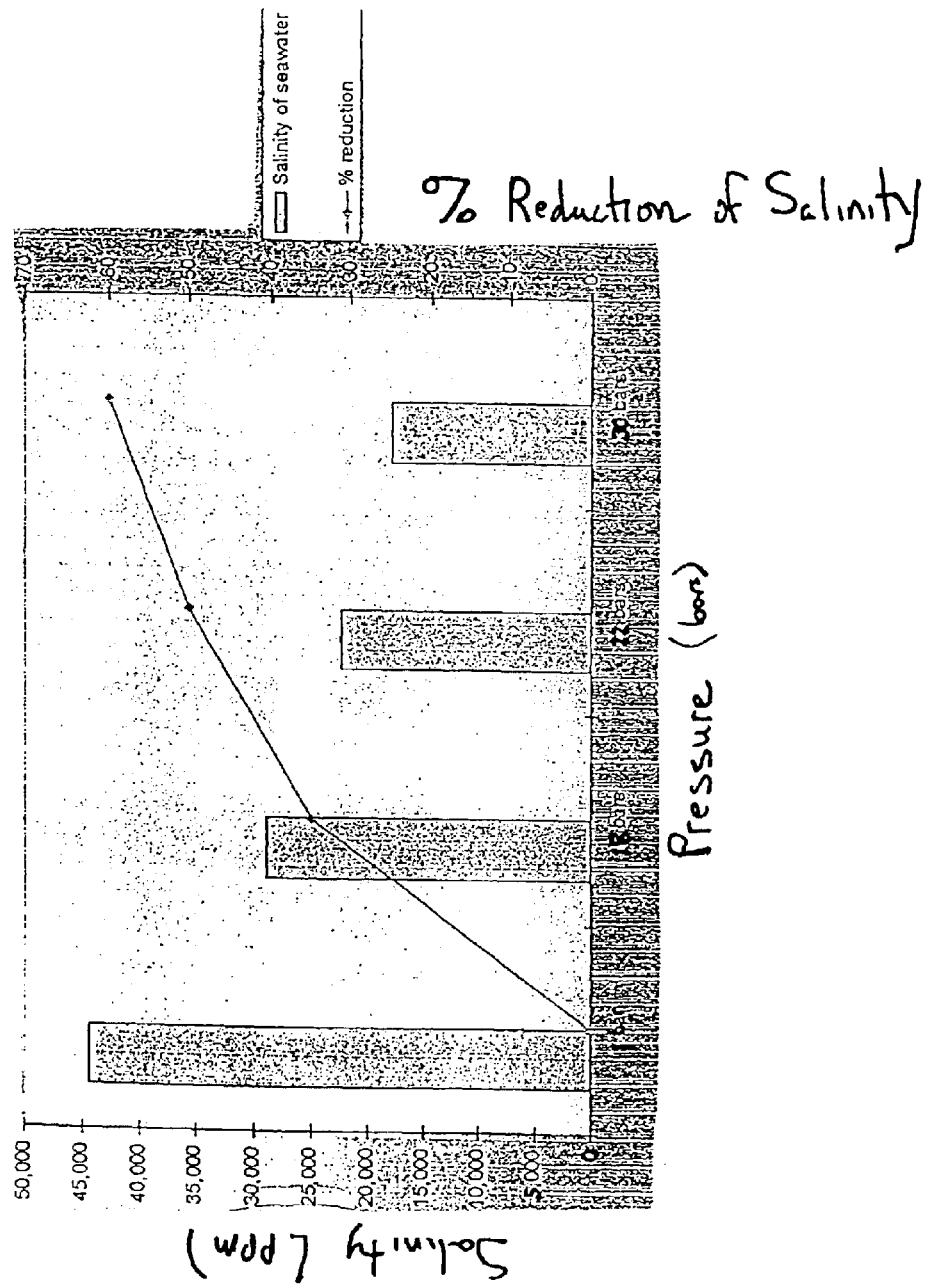
FIG. 5 is a graph showing the reduction in salinity by nanofiltration as a function of applied pressure.

The following sequence of Tables 2–5 demonstrates that the use of ion selective membranes will remove a large proportion of the most significant scaling compounds from sea water make-up to be fed to a desalination unit. The typical chemical composition of MSF recycle and the average sea water feed of Arabian Gulf sea water is shown in Table 2 below. However pursuant to the invention, a first stream of salt water having a high concentration of hardness ions is passed through an ion selective membrane to form a softened salt water. The softened sea water is then blended with normal untreated sea water to lower the scaling potential of the make-up. The data of Table 3 is representative of the performance of a NF membrane. In addition, Table 3 shows the removal of sulfate, magnesium, calcium and bicarbonate ions in much larger percentages than monovalent ions of sodium, potassium and chloride. Typical reductions of sulfate, calcium, magnesium and bicarbonate ions are shown in Table 4 when a NF membrane Filmtec SR90 is used. Table 4 demonstrates the ability to employ NF technology to achieve a higher system rejection of scaling ions in the first stage versus subsequent stages of nanofiltration. Finally, FIG. 5 shows performance of nanofiltration membranes as developed by Hydranautics.

TABLE 2

CHEMICAL COMPOSITION OF MSF RECYCLE AND AVERAGE SEAWATER FEED

| | Recycle Typical Gulf MSF | Sea water Quality at Doha | |
|---|---|---|---|
| | Ionic Strength 1.4078 ppm | Concentration | mg/l |
| Sodium | 21,013 | 12,300 | ±20 |
| Calcium | 786 | 570 | ±45 |
| Magnesium | 2,627 | 1,700 | ±150 |
| Bicarbonate | 209 | 185 | ±18 |
| Chloride | 37,190 | 24,000 | ±700 |
| Sulfate | 5,229 | 3,400 | ±300 |
| Carbonate | 21 | 14 | ±8 |
| TDS | 67,075 | 47,000 | ±2000 |

TABLE 3

NANOFILTRATION NF MEMBRANE PERFORMANCE

| ION | SEAWATER (ppm) | NF PERMEATE (ppm) | SYSTEM % REJECTION |
|---|---|---|---|
| Sodium | 11,200 | 10,050 | 10 |
| Potassium | 370 | 320 | 14 |
| Calcium | 400 | 309 | 23 |
| Magnesium | 1,400 | 330 | 76 |
| Chloride | 19,750 | 19,000 | 4 |
| Sulfate | 2,650 | 48 | 98 |
| Bicarbonate | 140 | 20 | 86 |
| Total | 35,910 | 30,715 | |

TABLE 4

NF MEMBRANE SOFTENING

| | Sea water Feed | First Stage | Second Stage |
|---|---|---|---|
| Sulfate | 2700 | 22 | 90 |
| Calcium | 410 | 108 | 204 |
| Magnesium | 1310 | 440 | 690 |
| Bicarbonate | 150 | 29 | 72 |

TABLE 5

NF MEMBRANE PERFORMANCE

| ION | SEAWATER (ppm) | NF PERMEATE (ppm) | SYSTEM % REJECTION |
|---|---|---|---|
| Sodium | 12,100 | 10,442 | 13.7 |
| Magnesium | 1,100 | 713 | 35.2 |
| Chloride | 18,100 | 16,073 | 11.2 |
| Sulfate | 2,580 | 21 | 99.2 |

However, the advantages and improvements of the present invention do not reside with the mere combination, as disclosed by WO 99/16714, of an ion selective membrane and a desalination process for the production of potable water. Rather, the previously unrecognized advantage of the present invention resides, in part, with the introduction of a feed of variable proportions of softened and untreated salt water to a desalination system to increase the top operating temperature of the system and increase the yield of potable water. In contrast, WO 99/16714 teaches a hybrid process wherein 100% of the feed is subjected to a nanofiltration pre-treatment process prior to being feed to a desalination unit. Furthermore, the ion selective membrane can be advantageously operated, in accordance with the invention, at a variable pressure as a function of energy costs to achieve a significant improvement in the cost-efficiency of the desalination plant. There is no illustration or suggestion in WO 99/16714 that a variable percentage of make-up and/or operating pressure would advantageously improve the performance of desalination plants.

In accordance with the broad aspects of the invention, a first stream of salt water containing a high concentration of hardness ions is passed through an ion selective membrane to form a softened salt water having a reduced concentration of hardness ions. The softened salt water is blended with a second stream of untreated salt water containing a high concentration of hardness ions to form a feed to a desalination system. The feed is then introduced to a desalination system to form a water product of potable quality. The percentage of softened salt water is at least 5% of the make-up. It should be recognized that the source of softened salt water can also be supplied by any salt water stream that has already passed through the ion selective membrane and/or desalination system and that is recycled through the desalination system. It is the reduced concentration of hardness ions that is determinative of the suitability of softened salt water for blending to form make-up to a desalination system as contemplated by the present invention.

A further protection against scale forming ions, in particular carbonate and magnesium hydroxide scale, is the addition of stoichiometric amounts of acid, e.g., 10–100 ppm of sea water feed, prior to passing the sea water through an ion selective membrane. Examples of acid that are suitable for this purpose include hydrochloric and sulfuric acid. The addition of acid protects the ion selective membrane, improves rejection and filtration, and reduces alkalinity. Furthermore, the combination of the acid and membrane treatment affords an additional protection to the desalination plant by reducing or optionally eliminating the use of antiscalants.

FIG. 1 illustrates a basic flow diagram of an integrated hybrid desalination process using a hybrid of selective ionic membrane and desalination systems including multistage flash distillation, multieffect distillation, vapor compression distillation and reverse osmosis desalination. As shown in FIG. 1, a stream of intake salt water is blended with a portion of make-up stream from the heat reject section of the distillation plant. The make-up stream from the heat reject section is characterized by a reduced content of hardness ions. The sea water stream to be subjected to NF treatment undergoes pre-treatment to remove suspended solids by means of fixed media filtration or micro- or ultra-filtration equipment. The sea water stream with a silt density index (SDI) of 5 or better is pressurized between 5–80 bars below the osmotic pressure of the solution and enters the NF membrane unit. The NF membrane assembly is composed of several arrays with a typical two to one ratio. Each of the NF modules contains from 4–8 NF elements. The treated, softened sea water stream is then blended with untreated salt water to form make-up to any of the shown distillation units.

Another important and advantageous aspect of the invention is the recognition that the ion selective membrane can be operated at a variable pressure as a function of the cost of electricity to maximize the energy efficiency and yield of the desalination plant. Generally speaking, the ion selective membrane is operated at pressures of 5–80 bars, but in all cases, below the osmotic pressure of the salt water stream to be treated. At the upper range of operating pressures, there is an increased reduction of scaling ions and total salinity. However, operation of the ion selective membrane system at such higher pressures requires a greater demand for energy utilization. Therefore, the variability of operating pressures as a function of the cost of electricity optimizes the energy efficiency and yield of the desalination plant.

This option is particularly advantageous in regions like the Middle East where there are wide seasonal and daily variations with regard to the utilization of power. For example, in summer when there is a maximum peak demand for energy at an associated higher cost, the ion selective membrane system is operated at the lowest possible pressure, thereby minimizing energy consumption without adversely effecting a reduction of scaling ion content. Conversely, at off-peak power demand during the winter, the ion selective membrane system is operated at the upper range of operating pressures to increase the productivity and efficiency of the desalination plant. The ability to control the operating pressure of such systems is within the skill of the experienced plant operator. This advantage enables the plant operator to determine the ionic content and quality of the softened water product at the most energy efficient conditions at the time of operation.

The invention also provides an option to recycle a portion of a brine stream through the ion selective membrane system. The treated stream is then combined with the recycle flow with a sufficient reduction in scaling ions to permit an increase in the top operating temperatures of the desalination system. Similarly, in another embodiment, an ion selective membrane system is introduced at the point of brine blowdown where the concentration of scaling ions is the highest. A portion of the blowdown is then subjected to a nanofiltration step and recycled to the desalination system.

An advantageous embodiment of the present invention is the combination of a NF membrane system with MSF distillation. The principles of MSF distillation are simple. Sea water feed is pressurized and heated to the maximum plant temperature. When the heated liquid is discharged into a chamber maintained slightly below the saturation vapor pressure of the liquid, a fraction of its water content flashes into steam. The flash steam is then stripped of suspended brine droplets as it passes through a mist eliminator and condenses on the exterior surface of heat transfer tubing. The condensed liquid drips into trays as hot product water.

The unflashed brine enters a second chamber, or stage, where it flashes to steam at a lower temperature, thereby producing an additional quantity of product water. Simultaneously, the distillate from the first stage passes to the distillate tray in the second stage and gives up some of its heat. The flash-cooling process is repeated from stage to stage until both the cooled brine and the cooled distillate are finally discharged from the plant as blowdown brine and product water, respectively.

The recirculating stream flowing through the interior of the tubes that condenses the vapor in each stage serves to remove the latent heat of condensation. In so doing, the circulating brine is pre-heated to almost the maximum operating temperature of the process, simultaneously recovering the energy of the condensing vapor. This portion of the multistage flash distillation plant is called the "heat recovery" section. The pre-heated brine is finally brought up to the maximum operating temperature in a brine heater supplied with steam from an external source. At the cool end of the plant, a separate set of tubes is installed in several of the stages in a "heat rejection" section to remove the waste heat. A small fraction of this coolant becomes pre-heated make-up water.

According to one embodiment of the invention, a NF membrane softening system is introduced in a MSF distillation system after the MSF-deaeration unit. As a result of this arrangement, oxygen, residual chlorine and reduce corrosion are removed from the stream of untreated salt water before it enters the NF membrane system. Specifically, the stream of salt water to be subjected to NF treatment is subjected to a deaeration pre-treatment step before passing through the NF membrane system. Alternatively, a stream of softened salt water exiting the NF system is blended with a stream of untreated salt water. The blend passes through the MSF-deaeration unit before entering the distillation unit. A portion of the stream of untreated salt water is pre-heated by the heat of a reject stream of the desalination system before passing through the NF membrane system. In contrast to conventional MSF desalination plants operating at temperatures between 95–112° C., the MSF distillation system of the invention is operated at a temperature of 95–180° C. This top temperature is beyond that which is currently achievable by existing methods and specifically by the use of chemical additives.

Figure 2:
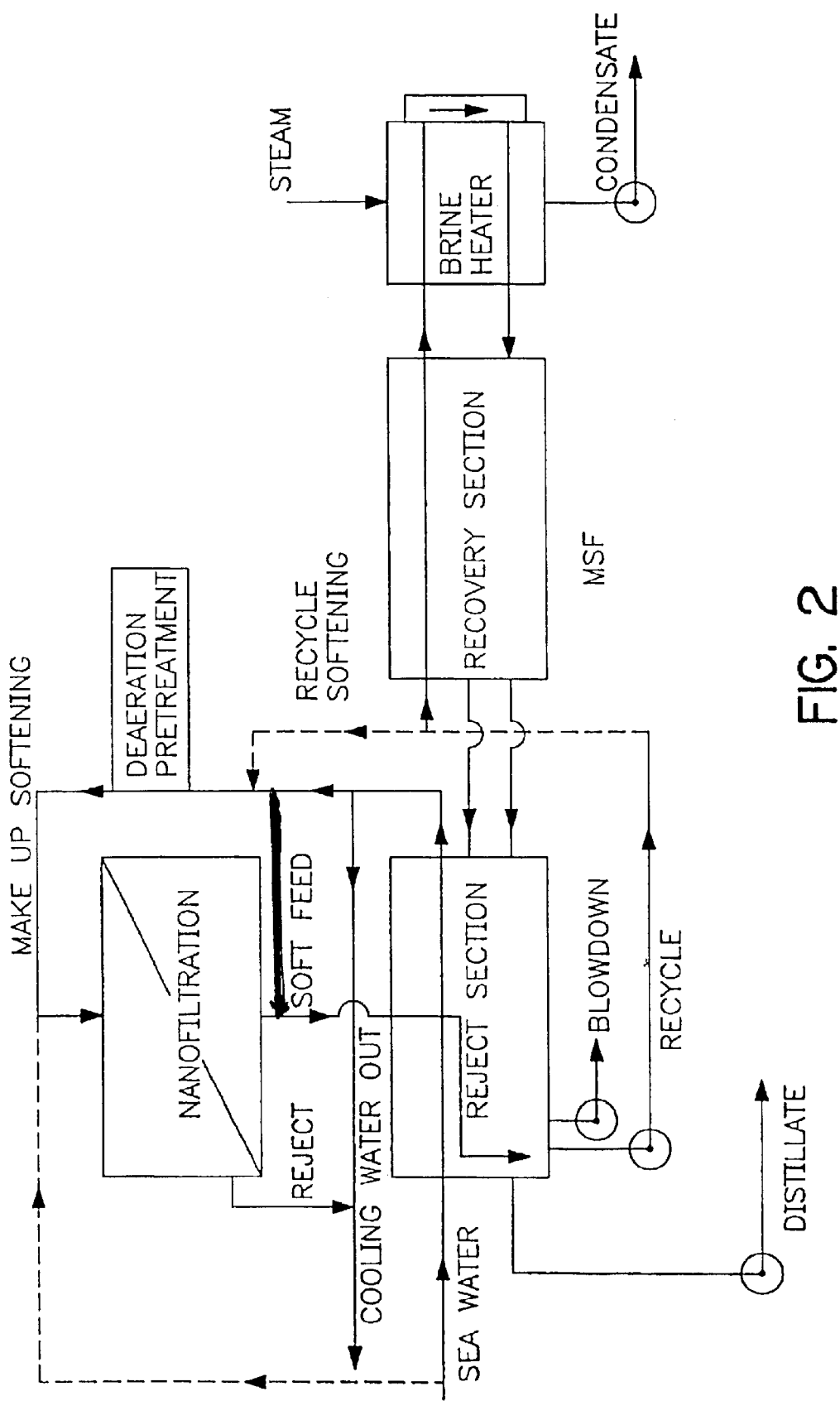
FIG. 2 is a schematic flow diagram illustrating the process of the invention as applied to multistage flash distillation in accordance with the invention.
Figure 3:
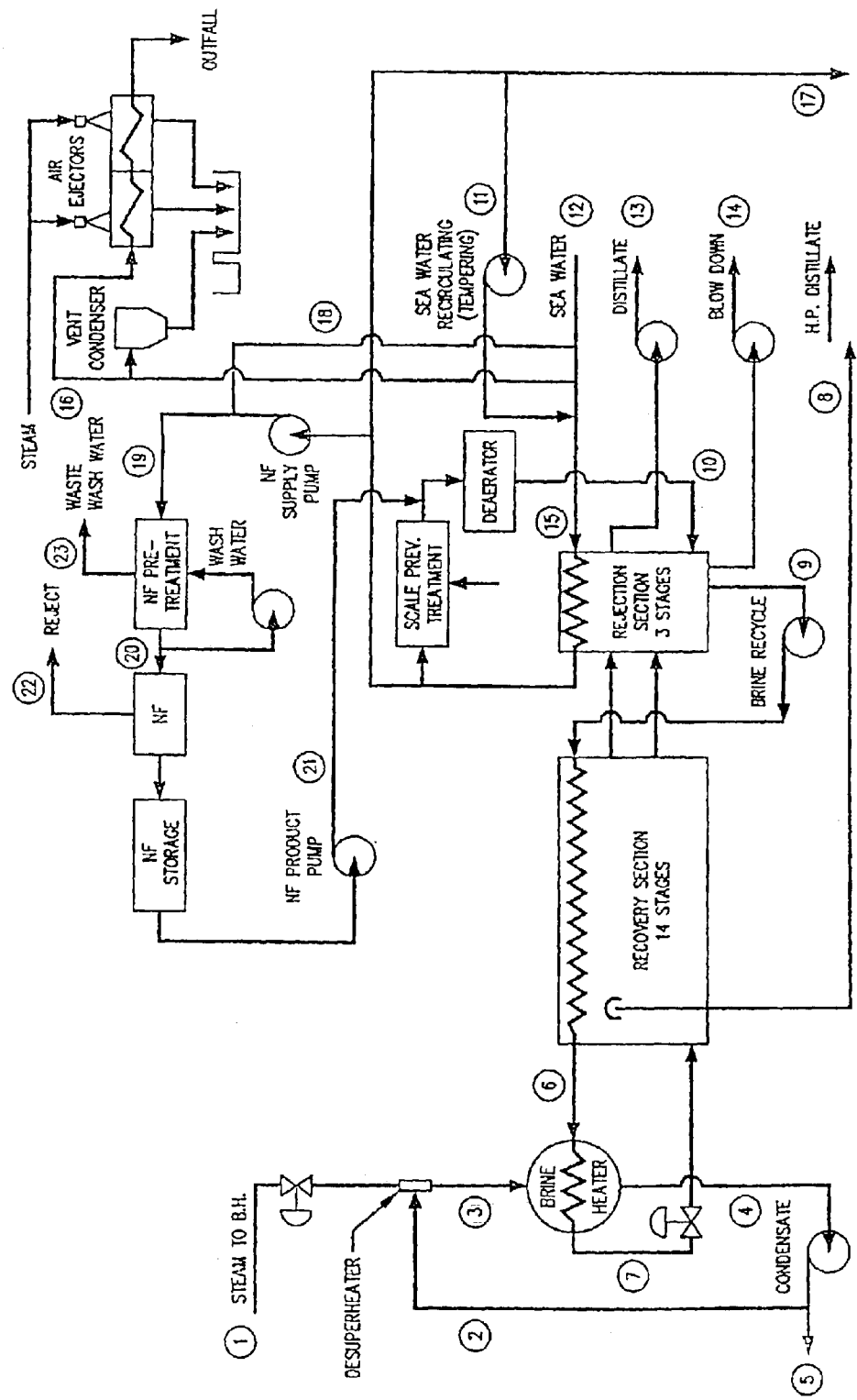
FIG. 3 is a schematic flow diagram showing the integration of a nanofiltration plant with an existing multistage flash distiller utilizing the process of the invention.

FIG. 2 provides a schematic representation of the process of the invention as applied to MSF. A projected commercial operation utilizing NF and MSF is represented in FIG. 3. The reference numbers appearing in FIG. 3 refer to the operating conditions, as set forth in Tables 8–11, at the identified stages of the system. As shown in FIG. 3, the NF unit is introduced as a if system on the warm feed that is part of the sea water cooling system before entering the MSF-deaerator. The recovery of water heat and the warming of the stream of sea water dearating the nanofiltration system significantly increases the fluxes and productivity of the NF elements. By this arrangement, it is possible to remove oxygen, residual chlorine and carbon dioxide from the feed stream and reduce its corrosiveness before the stream enters the MSF unit. The carbon dioxide released in the NF system can be recovered for beneficial uses, e.g., the post-treatment of the recovered water product.

Figure 4:
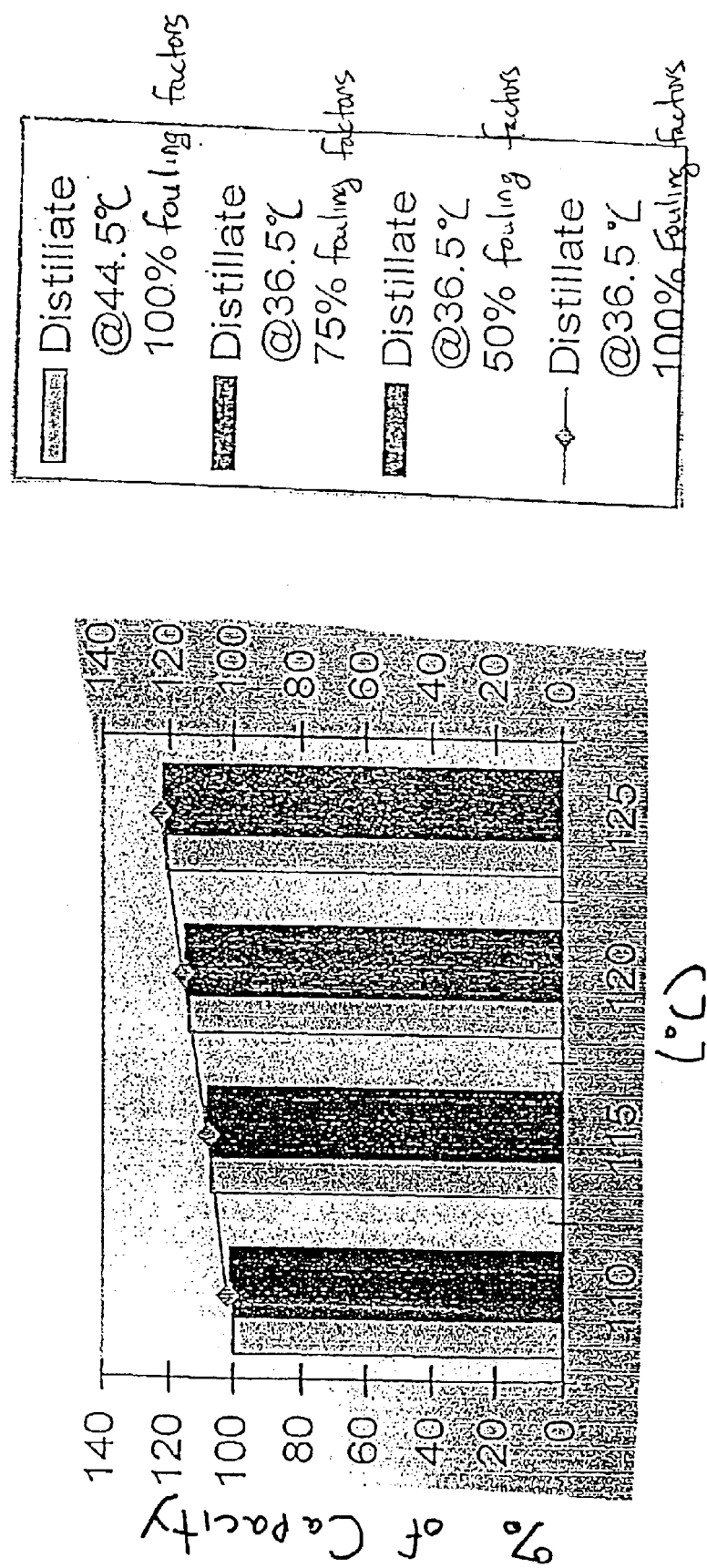
FIG. 4 is a graph showing the percentage increase in distillate production from a hybrid of nanofiltration and multistage flash distillation systems.

FIG. 4 shows that the NF system and process permits a safe increase in TBT, e.g., up to 125° C. This same Figure demonstrates a percentage increase in distillate production from MSF plants using NF systems of the present invention. As shown in FIG. 5, a reduction of total salinity by the NF system of the invention as a function of applied pressure permits not only a reduction of scaling compounds but also a partial-reduction in total salinity. The reduction of total salinity as achieved by the invention has the benefit of reducing boiling point elevation, improving the thermodynamic properties of brine, improving heat transfer coefficient and optimizing the make-up requirements. The use of the present invention will also reduce fouling factors as shown in Table 6:

TABLE 6

FOULING FACTORS WITH NF IN COMPARISON WITH CONVENTIONAL MSF PERFORMANCE

| Fouling factor @ temp ° C., in m²K/W | 125° C. | 120° C. | 110° C. | 90° C. and lower < |
|---|---|---|---|---|
| Brine heater w/NF | 0.000210 | 0.000200 | 0.000180 | 0.000180 |
| Brine heater w/o NF | NA | NA | 0.00258 | 0.000260 |
| Recovery Section w/NF | NA | NA | 0.000120 | 0.000105 |
| Recovery Section w/o NF | NA | NA | 0.000150 | 0.000150 |

In accordance with another embodiment of the invention, softened salt water is stored in a buffer system. This stored supply of softened water is available for blending with untreated salt water to form make-up that is introduced to the desalination system. In the absence of blending, the softened salt water that is stored in the buffer system can be injected directly into the desalination system. The supply of reserved softened salt water can be used to form a cluster feeding system wherein the softened salt water is fed to two or more desalination systems for blending with untreated salt water. The implicit advantage of this arrangement is the ability to determine the ionic content of the feed that is eventually passed to the desalination system. Consequently, it is possible to adjust operating conditions of the plant to control energy consumption. Moreover, the buffer system permits the shutdown of the ion selective membrane system without effecting the continuous operation of the desalination unit.

A simulation was conducted to evaluate the technical and economic feasibility of NF pre-treatment of make-up water to a typical MSF distiller in accordance with the process of the invention. The reference plant is an existing 5 migd MSF distiller in the Middle East. The reference plant was chosen as being relatively new (less than four years old) and comprises two identical 5 mgid units. The plant is situated in the Arabian Gulf and operates as part of a power and desalination plant. The plant operates with a TBT between 106° C and 112° C. The guaranteed unit heat rate at 106° C. TBT and 38° C. sea water (summer conditions) is 7.5 kg of distillate per 2326 kJ of heat input.

The NF design of the study was based on coagulation and multimedia filtration for pre-treatment with Dow Filmtec membranes, operating at manufacturer recommended conditions with a system recovery rate of 75%. Blending calculations were performed using varying proportions of NF product water with heated sea water to produce a modified blended MSF make-up water. The results are shown in Table 7 below. The resulting blended MSF make-up water was then used as the input water for purposes of the simulation.

The anhydrite scaling index (SI) against NF treated make-up blend ratios was then calculated and plotted at various concentration factors (CF). At each of four possible operating temperatures (115° C., 120° C., 125° C. and 130° C.), the maximum limit on allowable scaling index (SI) is shown FIGS. 6–9. From this data, it is evident that the concentration factor (CF) affects the required NIF blend ratio significantly. For example, an increase in CF from 1.4 to 1.5 requires an increase in NF blend ration of approximately 10%.

FIG. 3 shows a process flow diagram illustrating a proposed integration of a NF plant and a MSF plant such as the reference MSF plant used in the simulation. As a result of the integration pursuant to the process of the invention, it is possible to raise the TBT of the MSF plant, i.e., a typical 5 migd multistage flash installation operating at 106° C., to 125° C with 25% nanofiltration and increase output by 33.8%. Similarly, the TBT of the same MSF plant can be raised to 121° C. TBT with 10% nanofiltration and an increased output of 25%.

Tables 8–11 are heat and mass balance flow sheets for different alternatives (125° C. TBT and 121° C. TBT) operating in accordance with the invention. The flow sheets of Tables 8 and 10 are directed to summer conditions when the temperature of sea water is in the region of 38° C. whereas Tables 9 and 11 are directed to winter conditions when the temperature of sea water is 15° C. Reference number 13 of FIG. 3 and the corresponding column 13 of Tables 8–11 relate to distillate production from the NF-MSF system in accordance with the invention.

TABLE 7

CALCULATION OF BLENDED MSF MAKE-UP WATER QUALITY
(VARYING PROPORTIONS OF NF MEMBRANE PRODUCT & SEAWATER)

| | % NF 1 product) | | | | | | | | | | |
|---|---|---|---|---|---|---|---|---|---|---|---|
| | 100 | 90 | 80 | 70 | 60 | 50 | 40 | 30 | 20 | 10 | 0 |
| % sea | 0 | 10 | 20 | 30 | 40 | 50 | 60 | 70 | 80 | 90 | 100 |
| water | ppm | ppm | ppm | ppm | ppm | ppm | ppm | ppm | ppm | ppm | ppm |
| Na | 13935 | 14026 | 14117 | 14208 | 14299 | 14389 | 14480 | 14570 | 14660 | 14750 | 14840 |
| K | 336 | 352.5 | 369 | 385.5 | 401.9 | 418.3 | 434.8 | 451.1 | 467.4 | 483.7 | 500 |
| Mg | 687 | 773.9 | 860.7 | 947.4 | 1033.9 | 1120.3 | 1206.5 | 1292.6 | 1378.5 | 1464.3 | 1550 |
| Ca | 226 | 263.7 | 301.3 | 338.8 | 376.3 | 413.8 | 451.1 | 488.4 | 525.7 | 562.9 | 600 |
| Sr | 7 | 8.1 | 9.2 | 10.3 | 11.4 | 12.5 | 13.6 | 14.7 | 15.8 | 16.9 | 18 |
| Ba | 0.03 | 0.034 | 0.038 | 0.042 | 0.046 | 0.05 | 0.054 | 0.058 | 0.062 | 0.066 | 0.07 |
| Cl | 24089 | 24307 | 24525 | 24742 | 24959 | 25175 | 25392 | 25608 | 25823 | 26038 | 26253 |
| SO4 | 106 | 441.9 | 777.2 | 1112 | 1446 | 1779.9 | 2113 | 2445.6 | 2777.6 | 3109.1 | 3440 |
| CO3 | 0 | 3.8 | 7.7 | 11.5 | 15.3 | 19.1 | 22.9 | 26.7 | 30.5 | 34.2 | 38 |
| HCO3 | 80 | 84.8 | 89.7 | 94.5 | 99.3 | 104.1 | 108.9 | 113.7 | 118.5 | 123.2 | 128 |
| OH | 0 | 0 | 0 | 0 | 0 | 0 | 0 | 0 | 0 | 0 | 0 |
| TDS* | 39466 | 40262 | 41057 | 41850 | 42642 | 43432 | 44223 | 45011 | 45797 | 46582 | 47367 |
| pH | 7.8 | 7.92 | 8 | 8.05 | 8.09 | 8.12 | 8.15 | 8.16 | 8.18 | 8.19 | 8.2 |

*TDS = total dissolved solids

TABLE 8

125° C. TBT; 38° C. SW; 20% NF MAKE-UP

| Stream | 1 | 2 | 3 | 4 | 5 | 6 | 7 | 8 | 9 | 10 | 11 |
|---|---|---|---|---|---|---|---|---|---|---|---|
| Flow (Kg/s) | 49.504 | 1.76 | 51.263 | 51.263 | 49.504 | 3024 | 3024 | 7 | 3024 | 857 | 0 |
| Temp (° C.) | 195 | 132.42 | 130 | 132 | 132 | 115.7737 | 125 | 120 | 51.203 | 49.87 | 62.84 |
| Pressure (bar g) | 13.73 | 5 | 3 | 2.9 | 4 | 2.35 | 2 | 1.9 | 6.86 | | |
| Salinity (ppm) | | | | | | 6.73 | 6.73 | | | | |

| Stream | 12 | 13 | 14 | 15 | 16 | 17 | 18 | 19 | 20 | 21 | 22 | 23* |
|---|---|---|---|---|---|---|---|---|---|---|---|---|
| Flow (Kg/s) | 2278 | 352 | 505 | 1801 | 236 | 1115 | 241 | 241 | 229 | 171 | 58 | 660 |
| Temp (° C.) | 38 | 50.09 | 51.73 | 38 | 38 | 52.84 | 38 | 38 | 38 | 38 | 38 | 38 |
| Pressure (bar g) | 4.25 | | | 3.4 | 4.25 | 2.8 | 4.25 | 4.25 | 2 | | 1.5 | 1 |
| Salinity (ppm) | 4737 | | | 4737 | 4737 | 4737 | 4737 | 4737 | 4737 | 3950 | 7100 | 4737 |

*Typical intermittent flows

TABLE 9

125° C. TBT; 15° C. SW; 20% NF MAKE-UP

| Stream | 1 | 2 | 3 | 4 | 5 | 6 | 7 | 8 | 9 | 10 | 11 |
|---|---|---|---|---|---|---|---|---|---|---|---|
| Flow (Kg/s) | 56.177 | 2 | 58.177 | 58.177 | 56.177 | 3024 | 3024 | 7 | 3024 | 932 | 651 |
| Temp (° C.) | 195 | 133.56 | 130 | 132 | 132 | 114.5188 | 125 | 120 | 42.102 | 41.75 | 42.68 |
| Pressure (bar g) | 13.73 | 3 | 3 | 2.9 | 4 | 2.2 | 2 | 1.9 | 6.88 | | 2.8 |
| Salinity (ppm) | | | | | | 6.74 | 6.74 | | | | |

| Stream | 12 | 13 | 14 | 15 | 16 | 17 | 18 | 19 | 20 | 21 | 22 | 23* |
|---|---|---|---|---|---|---|---|---|---|---|---|---|
| Flow (Kg/s) | 1426 | 391.19 | 540 | 1801 | 236 | 182 | 40 | 262 | 250 | 186 | 63 | 660 |
| Temp (° C.) | 15 | 39.84 | 42.26 | 25 | 15 | 42.68 | 15 | 38 | 38 | 38 | 38 | 15 |
| Pressure (bar g) | 4.25 | | | 3.4 | 4.25 | 2.8 | 4.25 | 4.25 | 2 | | 1.5 | 1 |
| Salinity (ppm) | 4737 | | | 4737 | 4737 | 4737 | 4737 | 4737 | 4737 | 3950 | 7100 | 4737 |

*Typical intermittent flows

TABLE 10

121° C. TBT; 38° C. SW; 10% NF MAKE-UP

| Stream | 1 | 2 | 3 | 4 | 5 | 6 | 7 | 8 | 9 | 10 | 11 |
|---|---|---|---|---|---|---|---|---|---|---|---|
| Flow (Kg/s) | 46.359 | 1.63 | 47.992 | 47.992 | 46.359 | 3024 | 3024 | 7 | 3024 | 818 | 0 |
| Temp (° C.) | 195 | 128.03 | 130 | 128 | 128 | 112.1674 | 121 | 115.5 | 51.508 | 51.22 | 52.68 |
| Pressure (bar g) | 13.73 | 5 | 3 | 2.5 | 4 | 2.2 | 2 | 1.9 | 6.99 | | |
| Salinity (ppm) | | | | | | 6.91 | 6.91 | | | | |

| Stream | 12 | 13 | 14 | 15 | 16 | 17 | 18 | 19 | 20 | 21 | 22 | 23* |
|---|---|---|---|---|---|---|---|---|---|---|---|---|
| Flow (Kg/s) | 2152 | 331.1 | 485 | 1801 | 236 | 1065 | 115 | 115 | 109 | 82 | 28 | 330 |
| Temp (° C.) | 38 | 49.96 | 51.62 | 38 | 38 | 52.68 | 38 | 38 | 38 | 38 | 38 | 38 |
| Pressure (bar g) | 4.25 | | | 3.4 | 4.25 | 2.8 | 4.25 | 4.25 | 2 | | | |
| Salinity (ppm) | 4737 | | | 4737 | 4737 | 4737 | 4737 | 4737 | 4737 | 3950 | 7100 | 4737 |

*Typical intermittent flows

TABLE 11

121° C. TBT; 16° C. SW; 10% NF MAKE-UP

| Stream | 1 | 2 | 3 | 4 | 5 | 6 | 7 | 8 | 9 | 10 | 11 |
|---|---|---|---|---|---|---|---|---|---|---|---|
| Flow (Kg/s) | 53.45 | 1.89 | 55.337 | 55.337 | 53.45 | 3024 | 3024 | 7 | 3024 | 900 | 683 |
| Temp (° C.) | 195 | 129.22 | 130 | 129 | 129 | 110.8144 | 121 | 115.5 | 41.817 | 41.75 | 42.17 |
| Pressure (bar g) | 13.73 | 5 | 3 | 2.6 | 4 | 2.2 | 2 | 1.9 | 6.98 | | |
| Salinity (ppm) | | | | | | 6.91 | 6.91 | | | | |

| Stream | 12 | 13 | 14 | 15 | 16 | 17 | 18 | 19 | 20 | 21 | 22 | 23* |
|---|---|---|---|---|---|---|---|---|---|---|---|---|
| Flow (Kg/s) | 1376 | 374.6 | 525 | 1801 | 236 | 202 | 20 | 126 | 120 | 90 | 30 | 330 |
| Temp (° C.) | 15 | 39.39 | 41.84 | 25 | 15 | 42.17 | 15 | 38 | 38 | 38 | 38 | 15 |
| Pressure (bar g) | 4.25 | | | 3.4 | 4.25 | 2.8 | 4.25 | 4.25 | 2 | | | |
| Salinity (ppm) | 4737 | | | 4737 | 4737 | 4737 | 4737 | 4737 | 4737 | 3950 | 7100 | 4737 |

*Typical intermittent flows

The data of Tables 8–11 demonstrate that the TBT and output of a MSF plant are substantially increased through the use of NF pre-treatment and blending of the make-up water. These improvements are achieved by blending a stream of softened salt water and untreated salt water to form a feed to the desalination system. As a result, it is possible to operate the MSF plant at a higher TBT. Advantageously, the increased output is attained at lower operating costs for the NF and MSF plants.

Although the invention has been described in terms of preferred embodiments, it is to be understood that the present invention may be changed or modified without departing from the spirit and scope of the invention as claimed.

What is claimed is:

1. A desalination process to produce potable water which comprises:
   (a) passing a first stream of water containing a high concentration of hardness ions through an ion selective membrane to form a softened water having a reduced content: of hardness ions;
   (b) blending the softened water with a second stream of water containing higher concentration of hardness ions than the softened water to form a feed to a thermal desalination system; and
   (c) introducing the feed to the desalination system to form a water product of potable quality, wherein the proportions of the softened and second stream of water forming the feed to the desalination system are varied to the top operating temperature or the system and increase recovery of potable water.

2. The desalination process according to claim 1, wherein the softened water content of the feed is at least 5%.

3. The desalination process according to claim 1, wherein the feed is passed through at least one desalination system selected from the group consisting of multistage flash distillation, multieffect distillation and vapor compressior: distillation.

4. The desalination process according to claim 1, wherein the desalination system is multistage flash distillation.

5. The desalation process according to claim 4, wherein the multistage flash distillation system is operated at a temperature of 95–180° C.

6. The desalination process according to any one of claims 1, 4 or 5, wherein the ion selective membrane is operated at a variable pressure of 5–80 bar.

7. The desalination process according to claim 6, wherein the ionic content and quantity of softened water varies with the operating pressure of the ion selective membrane.

8. The desalination process according to claim 1 or 4, wherein the ion selective membrane is a nanofiltration membrane.

9. The desalination process according to claim 8, wherein the first stream of water is subjected to a deaeration pre-treatment cut step after passing through a softening system comprised of one or mole nanofiltration membranes.

10. The desalination process according to claim 9, wherein the first stream of water is pre-heated by the heat of a reject stream of the desalination system before deaeration.

11. The desalination process according to claim 1, wherein the softened water is stored in a buffer system.

12. The desalination process according to claim 11, wherein the softened water stored in the buffer system is blended with the second stream of water to form the feed to the desalination system.

13. The desalination process according to claim 11, wherein the softened water stored in the buffer system is injected into the desalination system.

14. The desalination process according to claim 1, wherein the softened water is fed by a cluster system to two or more desalination systems and blended with the second stream of each system.

15. The desalination process according to claim 1 or 12, wherein the ion selective membrane is operated at a variable pressure as a function of the cost of electricity to form the softened water that is blended in variable proportions with the second stream to increase the operating temperature of the desalination system and increase recovery of potable water.

16. The desalination process according to claim 1, wherein the desalination system produces brine containing water selected from the group consisting of reject, blowdown and recycled brine which is partially subjected to a nanofiltration step and recycled through the desalination system.

17. The desalination pass according to claim 1, wherein a stoichiometric amount of acid is added to the first stream before the stream passes through the ion selective membrane.

18. The desalination process of claim 1, wherein the first stream of water is selected from a group consisting of salt water, seawater, brackish water and impaired water.

19. The desalination process of claim 18, wherein the impaired water contains soluble salts having an ionic content of harness ions in excess of 1,500 mg/liter.

* * * * *

UNITED STATES PATENT AND TRADEMARK OFFICE
CERTIFICATE OF CORRECTION

PATENT NO. : 6,783,682 B1
DATED : August 31, 2004
INVENTOR(S) : Leon Awerbuch

It is certified that error appears in the above-identified patent and that said Letters Patent is hereby corrected as shown below:

Title page,
Item [56], References Cited, OTHER PUBLICATIONS, add the following:
-- Al-Sofi, M. A. K. et al., "Nanofiltration as a Means of Achieving Higher TBT of $\geq 120°C$ in MSF", Elsevier Scientific Publishing Corp., Amsterdam, vol. 118 (1998) 123-129. --

Column 13,
Line 21, "content:" should read -- content --.
Line 31, "to the top operating temperature or the system" should read -- to increase the top operating temperature of the system --.

Column 14,
Line 6, delete "cut".

Signed and Sealed this

Twenty-fifth Day of January, 2005

JON W. DUDAS
*Director of the United States Patent and Trademark Office*